(12) United States Patent
Gregory

(10) Patent No.: US 9,528,900 B2
(45) Date of Patent: Dec. 27, 2016

(54) BALANCED AND ECCENTRIC MASS COMPACT PENDULUM WITH DYNAMIC TUNING

(76) Inventor: Bruce Gregory, London (GB)

( * ) Notice: Subject to any disclaimer, the term of this patent is extended or adjusted under 35 U.S.C. 154(b) by 548 days.

(21) Appl. No.: 13/407,888

(22) Filed: Feb. 29, 2012

(65) Prior Publication Data

US 2012/0227485 A1 Sep. 13, 2012

(51) Int. Cl.
*G01M 1/36* (2006.01)

(52) U.S. Cl.
CPC ...................... *G01M 1/36* (2013.01)

(58) Field of Classification Search
CPC ........ F03G 3/06; F03G 7/10; F05B 2260/4031
USPC ...... 290/1 R; 74/DIG. 9, 61, 572.1, 112, 46; 415/916; 33/398, 391, 392
See application file for complete search history.

(56) References Cited

U.S. PATENT DOCUMENTS

| | | | | |
|---|---|---|---|---|
| 3,855,370 A | * | 12/1974 | Dodd | 261/92 |
| 3,968,365 A | * | 7/1976 | Sohngen | 250/338.1 |
| 4,011,674 A | * | 3/1977 | Jacobson | 40/426 |
| 4,302,682 A | * | 11/1981 | LaCoste | 290/1 R |
| 4,371,788 A | * | 2/1983 | Smith, Jr. | 290/42 |
| 4,667,413 A | * | 5/1987 | Pitts | 33/344 |
| 4,784,005 A | * | 11/1988 | Balken | 74/42 |
| 4,852,350 A | * | 8/1989 | Krisko | 60/325 |
| 5,140,565 A | * | 8/1992 | Katsma | 368/134 |
| 5,440,175 A | * | 8/1995 | Mayo et al. | 290/54 |
| 5,882,143 A | * | 3/1999 | Williams, Jr. | 405/78 |
| 6,022,173 A | * | 2/2000 | Saxon | 405/163 |
| 6,781,270 B2 | * | 8/2004 | Long | 310/90.5 |
| 7,151,322 B2 | * | 12/2006 | Eskandr | 290/1 R |
| 8,299,363 B2 | * | 10/2012 | Iijima et al. | 174/125.1 |
| 2004/0070208 A1 | * | 4/2004 | Chiu | 290/1 R |
| 2005/0160845 A1 | * | 7/2005 | Keefe | 74/84 S |
| 2007/0138793 A1 | * | 6/2007 | Zimmerman et al. | 290/1 R |
| 2008/0001579 A1 | * | 1/2008 | Claypool | 322/3 |
| 2009/0160191 A1 | * | 6/2009 | Beane | 290/53 |
| 2010/0127500 A1 | * | 5/2010 | Yang | 290/53 |
| 2010/0148517 A1 | * | 6/2010 | Duclos | 290/1 C |
| 2010/0237631 A1 | * | 9/2010 | Yu | 290/1 R |
| 2011/0057451 A1 | * | 3/2011 | Volmer et al. | 290/55 |

FOREIGN PATENT DOCUMENTS

| | | | | |
|---|---|---|---|---|
| GB | | 2473659 A | * | 3/2011 |
| GB | | 2473698 A | * | 3/2011 |

* cited by examiner

*Primary Examiner* — Tulsidas C Patel
*Assistant Examiner* — Charles Reid, Jr.

(57) ABSTRACT

A pendulum combining balanced and eccentric masses oscillates with a period that is rapidly and continuously varied by shifting the balanced masses and eccentric mass to and from the rotational axis, by controlling the amplitude of oscillation and, in a rolling embodiment, by varying the curvature of the rolling surface. Long period oscillations can be achieved without the large heights required by an equivalent conventional pendulum. The pendulum can be substantially isochronous. The pendulum can be applied to harvesting vibrational energy and especially to wave energy extraction by dynamically achieving resonance over the typical frequency range of energetic ocean swell.

11 Claims, 7 Drawing Sheets

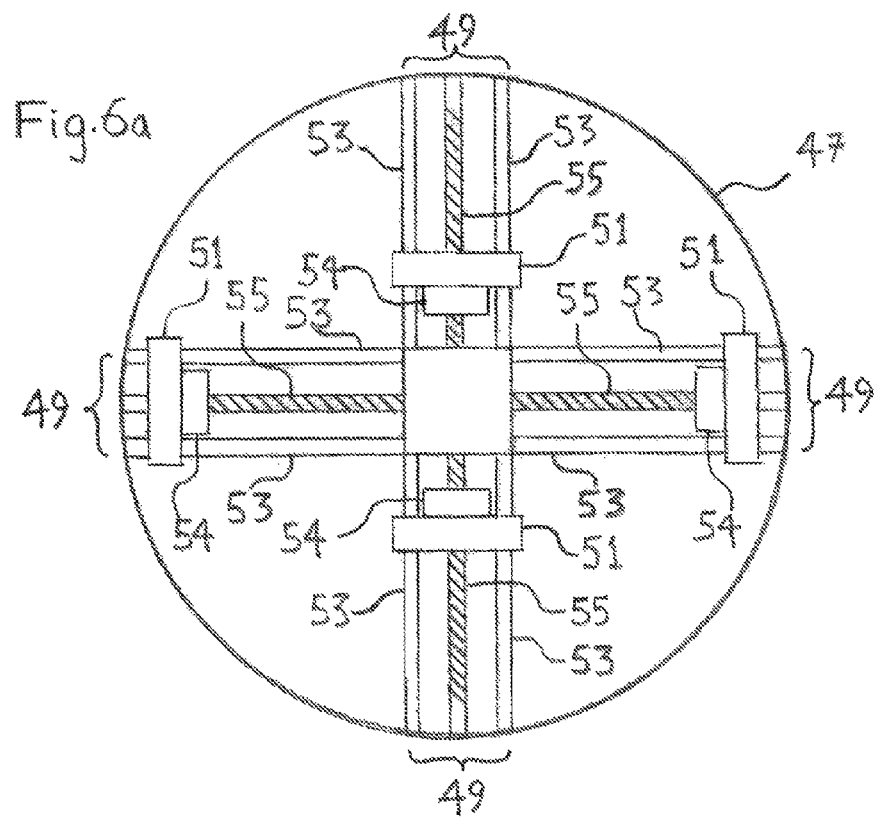
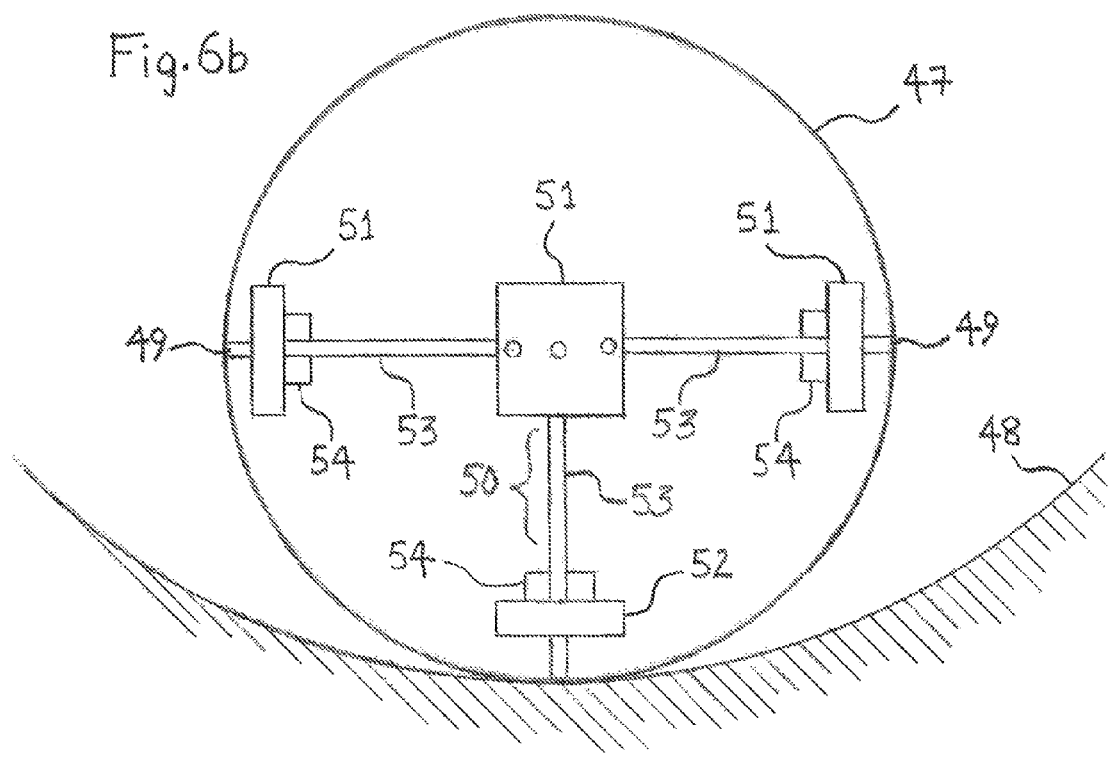

BALANCED AND ECCENTRIC MASS COMPACT PENDULUM WITH DYNAMIC TUNING

RELATED APPLICATIONS

This application is based on the pendulum disclosed in my patent application GB 0916518.4 of 1 Mar. 2011, which is incorporated by reference.

FIELD OF INVENTION

This invention relates to the use of a resonant pendulum to capture vibrational energy and to convert it to electrical energy with special reference to capturing the oscillating energy of waves.

BACKGROUND OF INVENTION

The attractions of wave energy have been widely asserted. In summary, ocean waves offer potentially cheap renewable energy with limited emissions of climate-changing carbon dioxide.

However, large-scale commercial application of wave energy has proved elusive due to:
Low efficiency of capture and conversion
High lifetime cost
Vulnerability to extreme storm conditions
Unacceptable environmental impact.

A solution described by Gregory (U.S. Ser. No. 12/884,792; 2010) is a dynamically tunable wave energy converter (WEC) arranged to pitch on ocean swell and comprising a dynamically tunable vessel enclosing a dynamically tunable compact gravity pendulum. The WEC is tuned to resonance with the dominant swell. The relative motion of vessel and pendulum mass is captured and converted to electricity. The WEC is sealed from the marine environment with no significant vulnerable external moving parts and is configured to allow in-situ repair. It can be submerged to avoid severe storms. Advantages claimed for this design are:
High efficiency of wave energy conversion due principally to use of the pitching vector and resonant energy transfer;
Low lifetime cost due to avoidance of sea-bed structures and reduced costs of repair and downtime;
Robustness against storms;
Unobtrusiveness.

A suitable pendulum for this application is:
Dynamically (ie continuously and rapidly) tunable, allowing resonant energy transfer from swells of varying frequency;
Tunable over most of the frequency range of energetic ocean swells: typically 5 to 14 seconds period;
Compact ie of significantly smaller dimensions than an equivalent conventional pendulum at the longer periods of oscillation of typical energetic ocean swells (A conventional pendulum requires a distance from pivot to center of mass that varies with the square of the period, so that at long periods, the pendulum becomes impractically large: for example, 14 seconds period requires a structure that accommodates rotation over a radius greater than 50 m.)
Isochronous ie with a period of oscillation independent of the amplitude of the path of the pendulum mass: this enables control in conditions of varying wave height. Over deflections from the vertical of less than around 40% a pendulum mass following a circular path is almost isochronous. A mass following a cycloidal path is isochronous at all amplitudes.

Such a pendulum is suitable for harvesting oscillating energy of variable frequency and amplitude at any scale.

Descriptions of pendulums in WECs date from the end of the 1800s. For example, Pitts (U.S. Pat. No. 613,075; 1898) describes a WEC using relative motion between a rocking float and an arm connected to a large mass suspended along the axial axis of the float and below it. The system is not tunable.

Conventional vertical pendulums in WECs have been described, sometimes in the form of pendulums that are able to swing in any vertical plane ie 360-degree pendulums. Conventional pendulums cannot resonate with the longer periods of high-energy swells without obtrusively and expensively large structures. Conventional vertical pendulums in WECs are described in the following patents:
Hoff (U.S. Pat. No. 656,645; 1900)
Gehre (U.S. Pat. No. 686,602; 1901)
Neal (U.S. Pat. No. 851,549; 1907)
Farmer (U.S. Pat. No. 974,869; 1910)
Lilley (U.S. Pat. No. 1,545,504; 1925)
Last (U.S. Pat. No. 3,696,251; 1972)
Filipenco (U.S. Pat. No. 3,912,938; 1975)
Marken (U.S. Pat. No. 4,438,343; 1984)
Beane (US 2011/0185719)
Hobdy (US 2010/0123313)

A variant of the conventional vertical pendulum is the inverted pendulum: this is also impractical for long period oscillation. Examples are Jacobi (U.S. Pat. No. 4,423,334; 1983), French (US 2004/0007880) and Smushkovitch (GB 2,436,644; 2007).

There are recurring descriptions of horizontal pendulums in WECs. These are usually configured as eccentrically weighted horizontally mounted wheels. Such pendulums can be compact. But the resonant period of a horizontal pendulum is infinite. This means that the pendulum will be randomly in or out of phase with vessel movements. An out-of-phase relative movement subtracts, rather than adds, energy to the pendulum. The random oscillation of the horizontal pendulum suits it to use only in random wave conditions where tunable inertial systems would be pointless, for example in chaotic, choppy seas. Its inefficiency makes it useless for commercial power production. Examples of horizontal pendulums in WECs, usually intended for low power applications such as signal buoys, are:
Singer and Wood (U.S. Pat. No. 624,490; 1894)
Keddy (U.S. Pat. No. 1,442,478; 1923)
Hegenbart (U.S. Pat. No. 1,584,293; 1925)
Hincke (U.S. Pat. No. 3,231,749; 1966)
Harding (U.S. Pat. No. 3,774,048; 1973)
Griffith (U.S. Pat. No. 4,256,971; 1981)
Ng (U.S. Pat. No. 4,266,143; 1981)
Slonim (U.S. Pat. No. 4,340,821; 1982)
Stupakis (U.S. Pat. No. 4,843,250; 1989)
Hench (US 2008/0093858):

Tracked pendulums in WECs have been described: these comprise a pendulum mass moving on a tracks with a vertical radius. A tracked pendulum can be compact, since neither pendulum arm nor pivot are used.

Caille (U.S. Pat. No. 721,501; 1908) describes an air pump driven by a mass sliding on a track in response to the rolling motion of a ship. Rahm (U.S. Pat. No. 1,494,804; 1924) describes a WEC using a mass moving on a track along the length of a ship, driven by pitching, and transmitting motion to a spirally grooved shaft. However, in both these cases the track is flat and so the period of oscillation is undefined. French (2004/0007880) describes a sliding mass in a WEC but the track is fixed: the radius of motion is fixed and therefore so is the frequency of oscillation. Beane (US 2011/0185719) describes a tracked mass in a WEC: the ends of the track are curved but the overall curvature of the track is not defined to be circular or cycloidal, so the tracked mass is not isochronous nor is it clear how the track radius might be dynamically adjusted.

Both French and Beane describe tuning by variable power take-off, or phase-forcing. For example, if the tracked mass is moving too fast (ie the period of oscillation of the mass is less than the period of the incident ocean swell), more power is extracted. A fatal defect in this method is that it requires reliable dynamic prediction of the power being transferred into the mass by the incident swell. This input of power depends on incident swell height, which in general is the result of interference between multiple wave trains and so is difficult to predict from moment to moment. By contrast, tuning by adjustment of the radius of the path of the mass can be substantially isochronous ie independent of wave height, enabling efficient resonant transfer of energy. Phase-forcing usually involves temporarily stopping or 'latching' of the mass, at which time no useful energy transfer takes place.

Tuning by latching is used by Clement (U.S. Pat. No. 7,989,975; 2011) who describes a WEC with a vertical pendulum. Clement's pendulum will usually be out of phase with the incident swell so that energy transfer is inefficient. By using latching, quasi-resonance is achieved and efficiency of energy transfer is improved but will typically be only a small fraction of the efficiency of resonant energy transfer.

Gregory describes two methods of dynamically tuning a tracked pendulum by varying the radius of the path of a tracked pendulum mass:
Using a flexible beam as the track and flexing the beam (Gregory GB 0916518.4; 2009)
Translating the pendulum mass between two fixed paths (Gregory US 2011/0089689)

Gregory also describes tracked pendulums in WECs made isochronous at large amplitudes using cycloidally curved tracks (Gregory GB 1103510.2; 2011).

Folding pendulums in WECs have been described by French (US 2004/0007880) and by Gregory (GB 0916518.4; 2010). Additional linkages are used to control the path of an otherwise conventional vertical pendulum, so that a folding pendulum can be a compact pendulum. The methods used by French and Gregory differ.

In summary, excepting the tracked and folding pendulums already described by Gregory, described pendulums in WECs do not meet all of the following criteria:
Dynamically tunable
Tunable over the range of periods that characterize energetic ocean swell
Compact
Isochronous The present invention describes a pendulum that meets these criteria but is neither a tracked nor a folding pendulum.

A pendulum that is applied within a WEC to generate commercial levels of power requires large masses, in the range 10-1000 tonnes. Such a pendulum requires means of suspension that are reliable for long periods and also requires means of dealing with very large sideways forces. In the case of the tracked pendulum, dynamic adjustment of the track radius under very large loads is problematic and sideways forces place a major strain on the track. In the case of variants of the folding pendulum, similar concerns arise. An objective of the present invention has been to use robust means of suspension and in an embodiment of the invention, to deal with sideways forces by means of a compliant mechanical arrangement.

SUMMARY DESCRIPTION OF INVENTION

The present invention is a dynamically tunable balanced and eccentric mass pendulum (BEMP) applicable to harvesting oscillating energy that varies in frequency and amplitude and in an embodiment applied within a WEC.

In the general equation for a pendulum, the period of oscillation varies with $\sqrt{(MOI/RF)}$ where MOI=moment of inertia of the rotating system and RF=restoring force. In the conventional vertical pendulum, the mass is concentrated in a single bob. As a result the mass component of MOI and RF cancel out and the period of oscillation depends only on the radius of rotation of the bob. The BEMP enables the MOI and the RF to be controlled separately so that long periods can be achieved using a small radius of rotation.

The BEMP as applied to a WEC is described in two major embodiments:
A BEMP rotating in a single vertical plane. Three embodiments of suspension are described:
The BEMP pivots on fixed rotary bearings
The BEMP pivots on rollers
The BEMP rolls on a curved surface
A BEMP rotating in any vertical plane, comprising a sphere rolling on a curved surface.

Embodiments of mechanical power take off systems suitable for application in a WEC are described.

BRIEF DESCRIPTION OF DRAWINGS

The drawings are schematic and not to scale:
FIG. 6a: plan view of a spherical BEMP
FIG. 6b: side view of a spherical BEMP

DETAILED DESCRIPTION OF INVENTION

Figure 1A:
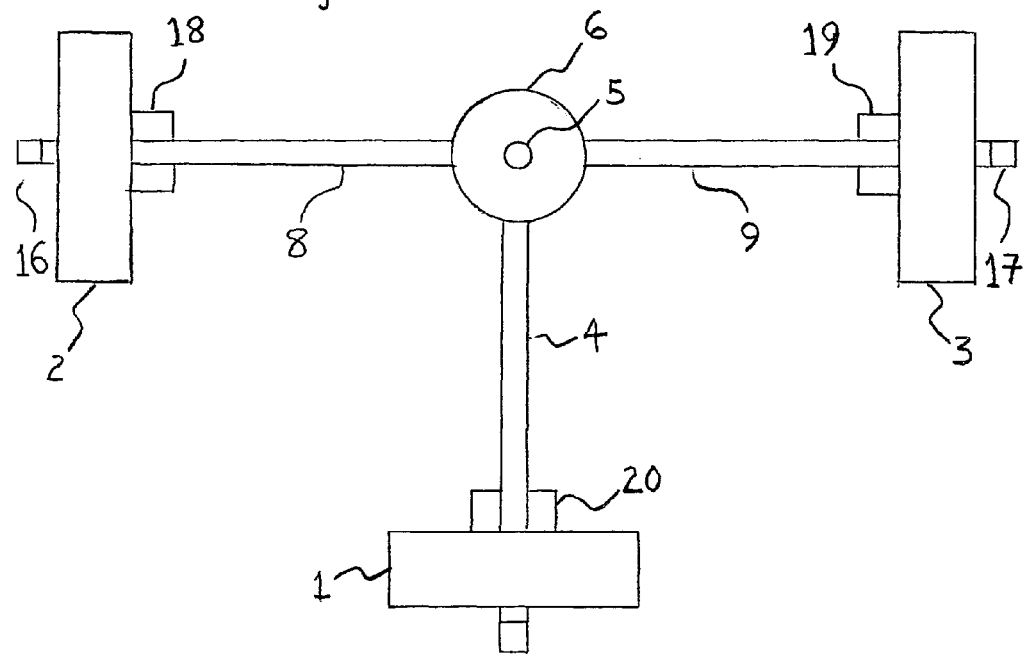
FIG. 1a: side view of a BEMP on fixed rotary bearings
Figure 1B:
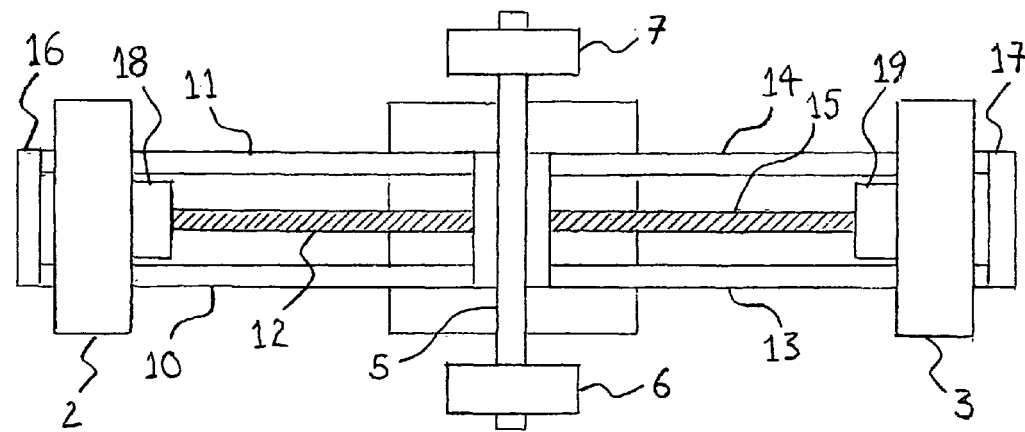
FIG. 1b: plan view of the same device

FIG. 1a shows a BEMP combining an eccentric mass (1) with two equal balanced masses (2) and (3). FIG. 1b is a plan view of the same device.

The first balanced mass (2) and the second balanced mass (3) are slidably attached to a first rigid arm (8) and a second rigid arm (9) respectively. The arms (8) and (9) are of equal length and fixed in alignment to each other to opposite sides of a horizontal axial shaft (5). The first and second balanced masses (2) and (3) are equidistant from the shaft (5).

The eccentric mass (1) is slidably attached to a third rigid arm (4) that is vertical when the BEMP is at rest. One end of the arm (4) is fixed to the horizontal axial shaft (5) at right angles to the first arm (8) and second arm (9) at the junction of arm (8) and arm (9). The shaft (5) is held by, and rotates inside, a pair of roller bearings (6) and (7) that are fixed to the enclosing structure (not shown).

The first arm (8) comprises two rigid smooth parallel outer rails (10) and (11) along which the first balanced mass (2) slides and an inner parallel threaded rod (12). The rails (10) and (11) and the rod (12) are rigidly fixed to each other by a cross-member (16). The second arm (9) has the same arrangement of two rigid smooth parallel outer rails (13) and (14) along which the second balanced mass (3) slides and an inner parallel threaded rod (15). The rails (13) and (14) and the rod (15) are rigidly fixed to each other by a cross-member (17).

The third arm (4) has the same arrangement of two parallel outer rails and an inner parallel threaded rod (not shown).

Two electrically powered self-locking screw jacks (18) and (19) are attached to the balanced masses ((2) and (3) respectively and ride on the threaded rods (12) and (15) respectively, so moving the balanced masses (2) and (3) respectively and always keeping the balanced masses (2) and (3) equidistant from the axis of rotation.

An electrically powered self-locking screw jack (20) rides on the threaded rod (not shown) incorporated into the third arm (4) and so moves the eccentric mass (1) up and down the third arm (4).

The screw jacks (18), (19) and (20) are powered via trailing cables (not shown).

Power Absorption and Take-Off

In a WEC the BEMP absorbs energy by resonating at the same frequency as the dominant wave in the plane of rotation of the pendulum.

In an embodiment of the BEMP, power is extracted from the motion of the BEMP by fixing a toothed wheel to the shaft (5) so that the toothed wheel rotates with the shaft. The toothed wheel drives an arrangement of gear-train, one-way clutches and fly-wheel to deliver high-speed uniform rotation to a rotary electrical generator. This arrangement is not shown.

Operation of Pendulum

The BEMP can behave in a manner that is the opposite of a conventional pendulum.

In the case of the conventional pendulum a single rigid arm is attached at one end to a fixed pivot and at the other end to a mass. The period of oscillation of the mass of the conventional pendulum is increased by moving the mass away from the pivot, so increasing the radius of oscillation. Where a long period is required, for example to tune the pendulum to the typical period of an ocean swell, the radius of oscillation required becomes large: up to 50 m.

By contrast, the BEMP can increase the oscillation period by reducing the radius of oscillation, so enabling a compact construction.

Figure 2A:
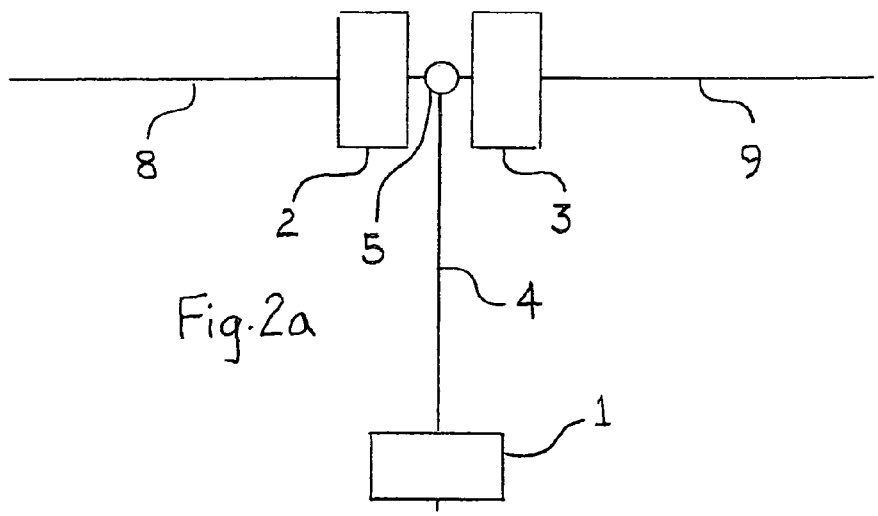
FIG. 2a: side view of a BEMP showing masses arranged for short periods of oscillation
Figure 2B:
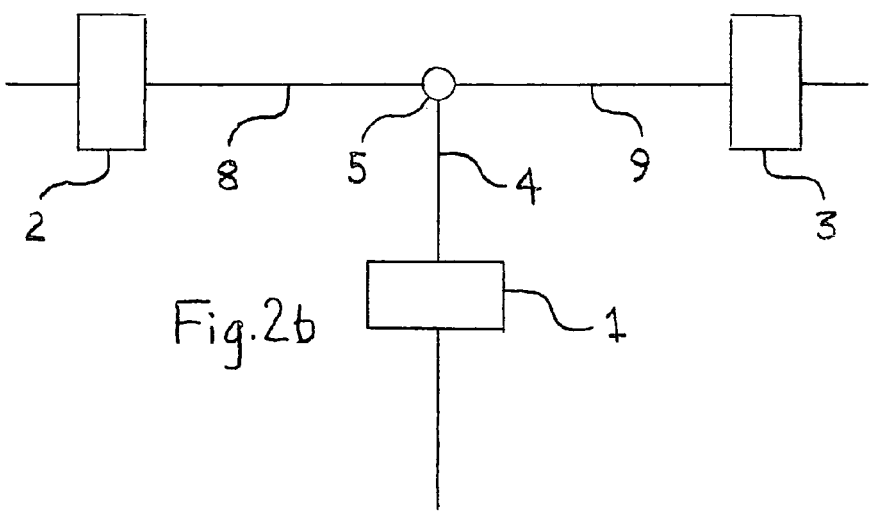
FIG. 2b: side view of a BEMP showing masses arranged for intermediate periods of oscillation
Figure 2C:
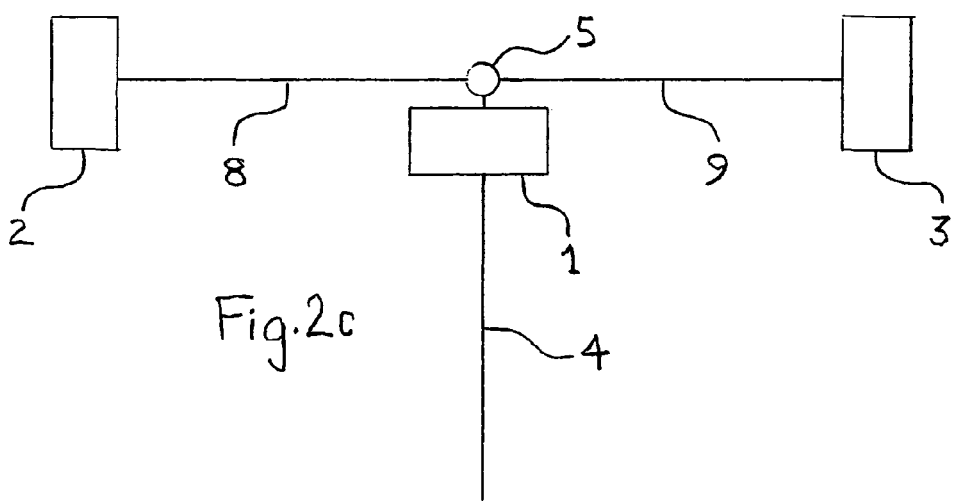
FIG. 2c: side view of a BEMP showing masses arranged for long periods of oscillation

This effect can be understood from FIGS. 2a to 2c, which show in simplified schematic form the side views of different positions of the eccentric mass (1) and the balanced masses (2) and (3).

The period of oscillation of the BEMP is given by:

$$Tp = 2\Pi\sqrt{(I/MgL)} \qquad 1.$$

where:
Tp is the oscillation period in seconds
I is the moment of inertia around the rotational axis in mass×meters
M is the total mass of the pendulum in kg
g is the gravitational constant (=9.81 meters/sec$^2$)
L is the distance of the center of mass of the pendulum from the rotational axis in meters
In the case illustrated in FIGS. 1a, 1b $$I = 2MbRb^2 + MeRe^2 + Ia \qquad 2.$$

where:
Mb=each balanced mass (2) and (3) including the mass of the attached screw jacks (18) and (19) respectively in kg
Rb=the radius from the axis to the center of mass of each balanced mass (2) and (3) in meters
Me=the eccentric mass (1) including the mass of the attached screw jack (20) in kg
Re=the radius from the axis to the center of mass of the eccentric mass (1) in meters.
Ia=moment of inertia of the arms ((4), (8) and (9)) around the rotational axis
To an approximation, assuming Mb and Me are large compared with the mass of the arms (4), (8) and (9):

$$L = Re\,Me/(2Mb+Me) \qquad 3.$$

Combining equations 1, 2 and 3 we get:

$$Tp = 2.01\sqrt{(2MbRb^2 + MeRe^2 + Ia)/((2Mb+Me) \times ReMe/(2Mb+Me))} \qquad 4.$$

Dropping Ia we get:

$$Tp = 2.01\sqrt{(2Mb/Me \times Rb^2/Re + Re)} \qquad 5.$$

In the special case of the conventional pendulum, which is assumed to have negligible mass apart from the pendulum bob, Mb=0 and equation 3 becomes:

$$Tp = 2.0\sqrt{(Re)} \qquad 6.$$

It is evident from equation 5 that we can increase Tp by:
Increasing the ratio Mb/Me
Increasing the ratio of Rb/Re
As Re is reduced to zero, Tp becomes infinitely large.
FIG. 2a shows Rb at a minimum and Re at a maximum
Assume that:
Mb/Me=1
Rb=0.5 m
Re=5 m
From equation 5, Tp=2.01√(0.1+5)=4.5 seconds
Where Rb is small, Tp is determined by Re.
If Re is reduced to 2 m, then from equation 5:
Tp=2.01√(0.125+2)=2.9 seconds
FIG. 2b shows the masses Me and Mb at midway positions
Assume that:
Rb=4.0 m
Re=2.5 m
From equation 5, Tp=2.01√(12.8+2.5)=7.9 seconds
Where Rb is large, Tp is determined by Rb.
FIG. 2c shows the mass Me close to the axis and the masses Mb at the furthest position from the axis
Assume that:
Rb=5.0 m
Re=0.5 m
From equation 5, Tp=2.01√(100.0+0.5)=20.2 seconds
The described BEMP is therefore capable of a wide and dynamic variation in period. By suitable choice of Mp, Mb and Rp, Rb, a range of periods can be achieved in a compact pendulum that matches the characteristic range of periods of ocean swells: namely 5 to 14 seconds.

If Rb is fixed (ie the balanced masses (2) and (3) do not move along the first and second arms (8) and (9) respectively), then the range of Tp is restricted.

For example, in the case given, if Rb is fixed at 5 m, then:

$$Tp=2.01\sqrt{(50/Re+Re)} \qquad 7.$$

And for Re=5 m to 0.5 m.
Tp=7.8 seconds to 20.2 seconds
This range of result can be shifted, for example, by reducing the ratio of Mb/Me to 0.5 so that:

$$Tp=2.01\sqrt{(25/Re+Re)} \qquad 8.$$

So that:
Tp=6.4 seconds to 14.3 seconds
This is very close to the range required for wave-power application.

If Re is fixed (ie the eccentric mass does not move along the third arm (4)) then Tp is again restricted.

For example, in the case given, if Re is fixed at 2 m, then:

$$Tp=2.01\sqrt{(Rb^2+2)} \qquad 9.$$

And for Rb=0.5 m to 5 m
Tp=3.02 seconds to 10.4 seconds
This range of result can be shifted, for example, by increasing the ratio of Mb/Me to 1.5 so that:

$$Tp=2.01\sqrt{(1.5Rb^2+2)} \qquad 10.$$

So that:
Tp=3.1 seconds to 12.6 seconds
If the maximum value of Rb is increased to 6 m, then using equation 10:
Tp=3.1 seconds to 15.0 seconds
This range meets the requirement for wave-power application.

The calculations of range of Tp given by equations 8 and 9 are approximate since Ia is neglected.

Alternative Modes of Suspension

Roller bearings (6) and (7) are available that enable construction of a multi-megawatt BEMP of many thousand tonnes total mass. For example, the largest standard Timken spherical roller bearing (outer diameter 1.95 m) can carry a dynamic load up to 3,000 tonnes. In principle, a set of four such bearings can support a total mass of 10,000 tonnes. Where Mb/Me=1, the eccentric mass Me=10000/3=3,300 tonnes (ignoring the mass of the arms).

The present invention also describes alternative embodiments of suspension that do not use conventional bearings and enable the economical use of very large masses.

Axle Rolling on Surface

Figure 3A:
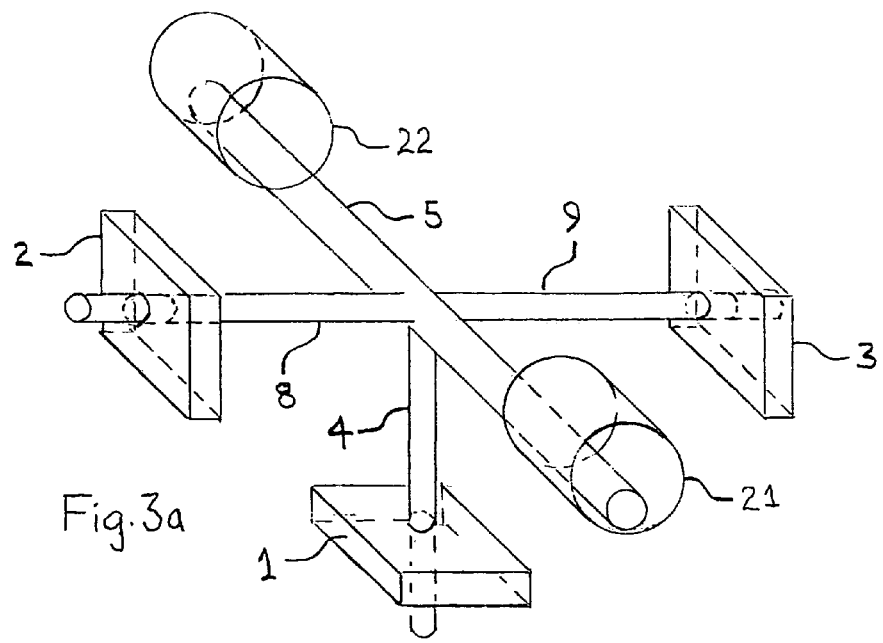
FIG. 3a: 3D schematic view of rolling suspension for a BEMP

FIG. 3a shows in 3D schematic form an alternative suspension. For simplicity the detail of the arms (4), (8) and (9) is omitted. The horizontal cylindrical axial shaft (5) rolls inside a pair of support tubes (21) and (22) that are fixed to the enclosing structure (not shown). This arrangement does not permit full rotation of the eccentric mass (1) but such rotation is not required and is prevented by progressive rate buffers (not shown).

Provided that the diameter of the axial shaft (5) is small compared with the radius of the centre of mass of the BEMP, the path of the centre of mass approximates to a circular arc. In general the path is a prolate cycloid. The rolling axle embodiment of the BEMP is substantively isochronous at amplitudes of the eccentric mass (1) that deviate from the vertical by under 45 degrees.

In a similar arrangement (not shown), the axial shaft (5) is hollow and inside the hollow shaft is a cylindrical shaft fixed at each end to the enclosing structure. The hollow axial shaft rolls on the internal fixed shaft.

Wheel Rolling on Surface

Figure 3B:
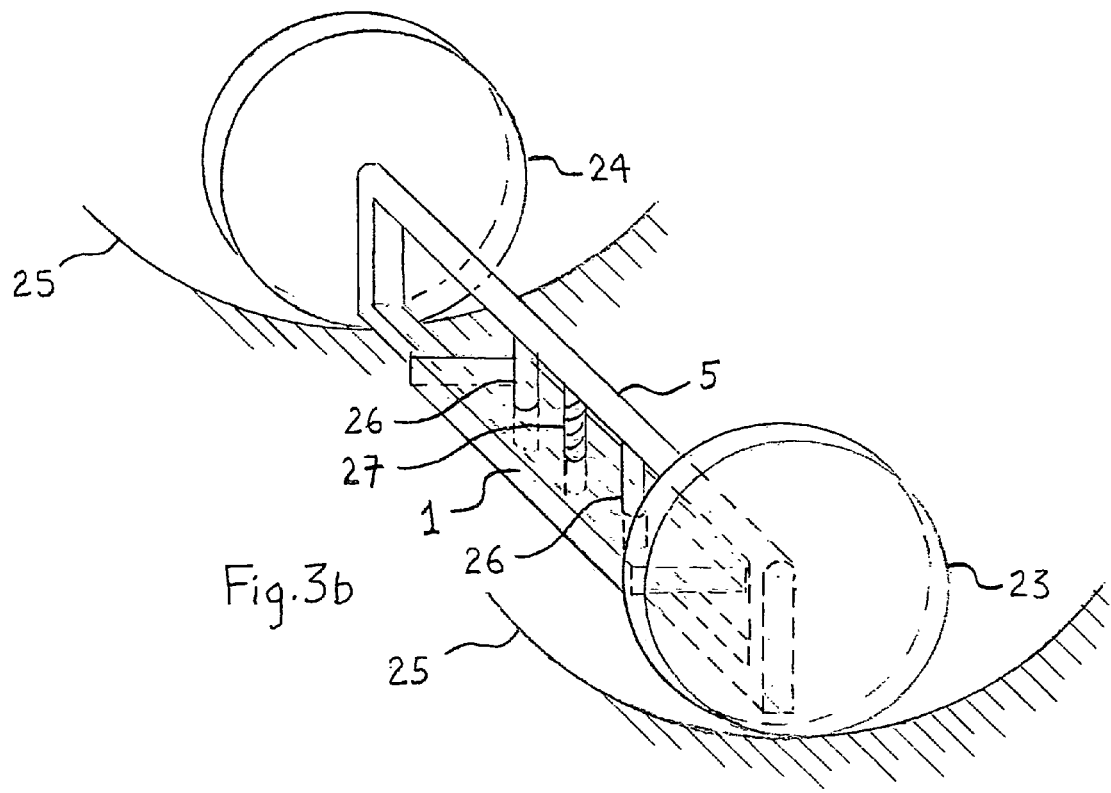
FIG. 3b: 3D schematic view of alternative rolling suspension for BEMP

FIG. 3b shows in 3D schematic form another alternative suspension. For simplicity the horizontal arms (8) and (9) are omitted. The horizontal axial shaft (5) is fixed at each end to identical vertical wheels (23) and (24). The two wheels (23) and (24) roll on a surface (25) that is fixed to the enclosing structure. The eccentric mass (1) slides on two parallel rails (26) and is moved by a screw jack (not shown) fixed to the mass (1) and mounted on a threaded rod (27).

The wheels (23) and (24) in themselves comprise a balanced mass. The moment of inertia of the wheels (23) and (24) varies with wheel mass and the square of the wheel radius. The largest moment of inertia is obtained when the wheel mass is concentrated in the rim.

As indicated by equation 7, a compact long period pendulum of variable period suitable for wave-power application can be constructed by concentrating sufficient mass into the rims of the wheels (23), (24) and by constructing wheels (23), (24) of sufficient radius.

The center of mass of the BEMP follows a curtate cycloidal path. Provided that the center of mass is at 60% or less of the radius of the rolling wheel and provided that rotation is less than around 90% of full rotation, then the path of the center of mass closely approximates a circular arc. As a result the rolling BEMP is substantively isochronous at amplitudes of the eccentric mass that deviate from the vertical by under 45 degrees.

Continuously Variable Curvature Rolling Surface

In an embodiment of the BEMP, the curvature of the rolling surface (25) can be continuously varied so that the rolling wheel variant of the BEMP is substantively isochronous at amplitudes of the eccentric mass that deviate from the vertical by under 90 degrees.

Figure 4A:
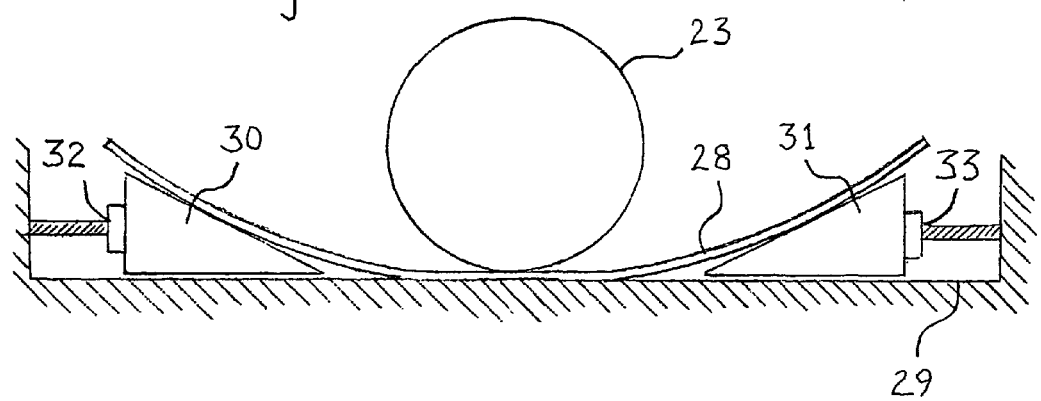
FIG. 4a: side view of a BEMP rolling on a variable curvature surface

FIG. 4a shows a schematic side view of a wheel (23) rolling on a flexible rolling surface. The surface is a flexible rectangular sheet (28) made of spring steel or a similar material. The sheet (28) rests on a flat horizontal surface (29) of the enclosing structure and is fixed to the surface (29) along the centre-line of the flexible sheet (28) where the center-line is at right-angles to the rolling path of the wheels (23) and (24).

Two sides of the sheet are parallel to the rolling path and two sides are at right angles to the rolling path. The narrow end of a first wedge (30) projects under the edge of the first of the latter sides. The narrow end of a second wedge (31) projects under the edge of the second of the latter sides. Each wedge (30) and (31) is as wide as the flexible sheet (28) and is slidably fixed to rails (not shown) that are embedded in the flat surface (29) parallel to the rolling path. The wedges (30 and 31) are fixed to screw jacks (32) and (33) respectively that move the wedges symmetrically to and from the centre-line, so increasing or reducing the curvature of the flexible sheet (28).

Alternative Means of Moving Masses

In an embodiment of the BEMP, the eccentric mass (1) and the balanced masses (2) and (3) are moved by screw jacks. In alternative embodiments of the BEMP, the masses are moved by rack and pinion devices or by hydraulic or pneumatic rams or by an arrangement of winches and pulleys. The masses (1), (2) and (3) can be containers of solid shot that is moved by Archimedean screws. The masses (1), (2) and (3) can be containers of liquid that is moved by pumps.

Alternative Power Take Off (PTO) Systems

In an embodiment of the BEMP, the PTO uses a cogged wheel fixed to the axial shaft (5). This cogged wheel drives a rotary electrical generator via a familiar arrangement of gear train, one-way clutches and flywheel, all fixed to the enclosing structure. In alternative embodiments of the invention, one or more arms (4), (8) and (9) of the BEMP are attached to one or more hydraulic pumps or to one or more cable-driven spools.

Cable-Driven Spool PTO

Figure 4B:
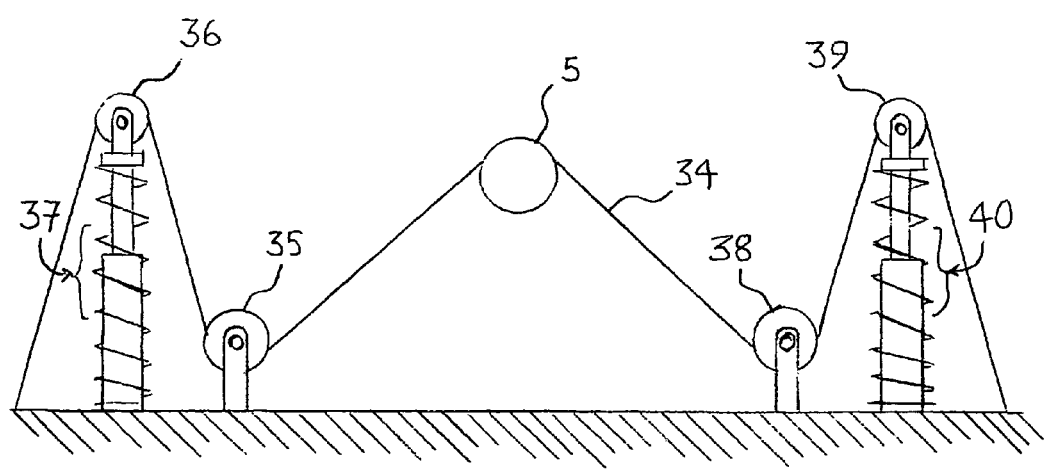
FIG. 4b: side view of a BEMP power take off system using cable-driven spools.

The mechanism of a cable-driven spool PTO is shown in a schematic side view in FIG. 4b. A cable (34) is looped round the axial shaft (5) or wheel (23) or (24). One end of the cable (34) is looped round a first spool (35) and then round a first pulley (36) and is then fixed to the enclosing structure. The first pulley (36) is held by a first cable shock absorber (37) fixed to the enclosing structure. The first shock absorber (37) comprises a progressive rate compression spring mounted on a progressive rate pneumatic damper. The other end of the cable (34) is looped round a second spool (38) and then round a second pulley (39) and is then fixed to the enclosing structure. The second pulley (39) is held by a second cable shock absorber (40) fixed to the enclosing structure. Each spool (35), (38) rotates on a shaft (not shown) that drives a rotary electrical generator via an arrangement (not shown) of one-way clutches, gear train and flywheel to deliver high-speed uniform rotation to a rotary electrical generator.

The shock absorbers (37), (40) keep the cable (34) under tension at all times. The shock absorbers (37), (40) also progressively arrest the motion of the BEMP at the extremes of its rotation.

When the axial shaft (5) turns or moves, it pulls the cable (34) on one side and releases the cable (34) on the other side. The pulled cable (34) turns the first spool (35), which drives a rotary electric generator. The released cable (34) is pulled by the second shock absorber (40) so that the second spool (38) free wheels.

When the axial shaft reverses its motion, the pulled cable (34) turns the second spool (38), which drives a rotary electric generator. The released cable (34) is pulled by the first shock absorber (37) so that the first spool (35) free wheels. And so on.

An advantage of the cable-driven spool PTO is that it can be applied where the axial shaft (5) does not remain in a fixed position. In the case of the rolling wheel variant of the BEMP (FIG. 3b) the axial shaft (5) moves from side to side and when rolling on a variable curvature surface (FIG. 4a), the axial shaft also moves up and down. This motion of the shaft (5) is readily accommodated by cable links.

Toothed Wheel on Frame

The rolling wheel embodiment of the BEMP shown in FIG. 3b can also use a toothed wheel fixed to the axial shaft (5) driving a rotary electrical generator via a familiar arrangement (not shown) of one-way clutches, gear train and flywheel. However, to accommodate the horizontal and vertical motion of the axial shaft (5) this drive arrangement must be fixed to a frame that moves with the axial shaft (5).

Figure 5:
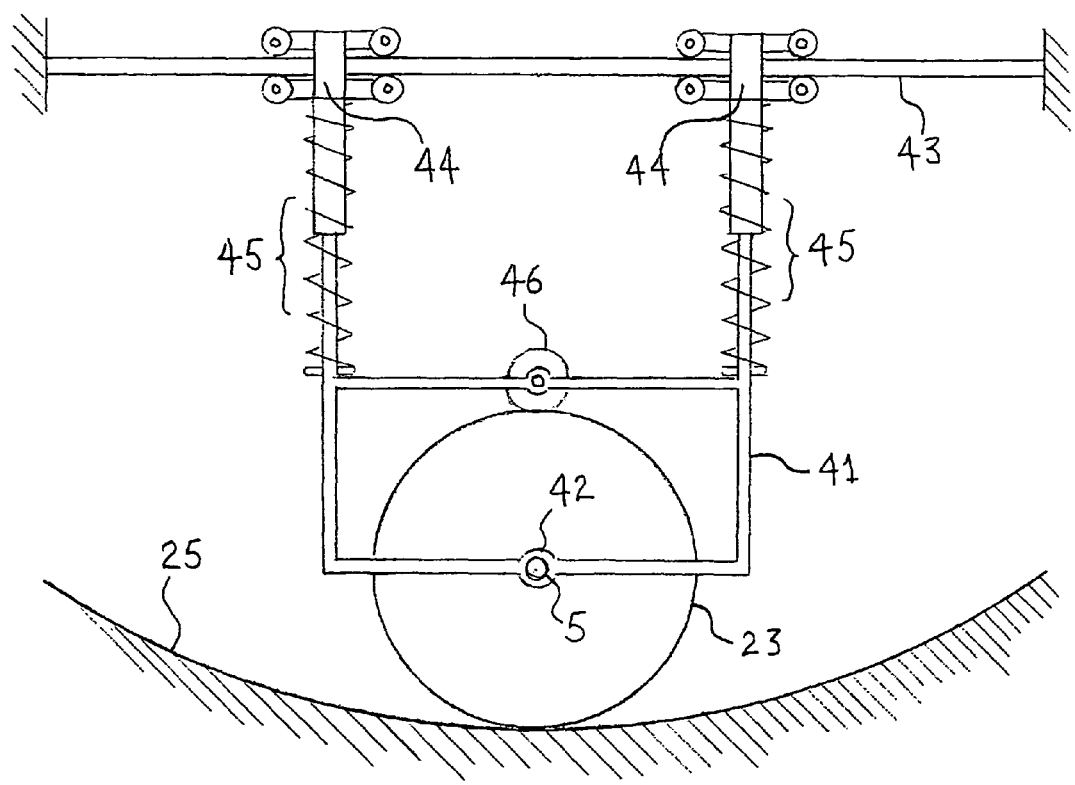
FIG. 5: side view of a BEMP power take off system using moving frame

FIG. 5 shows a schematic side view of a rigid cuboid frame (41) that is fixed by bearings (42) to the axial shaft (5) of the rolling BEMP. The frame (41) is slidably connected to parallel horizontal overhead rails (43) by vertical shock absorbers (45) each mounted on wheeled overhead chassis (44). The rails (43) are fixed to the enclosing structure. Movement of the frame (41) along the rails (43) is limited by progressive rate buffers (not shown). The PTO system (not shown) is carried on the upper part of the frame (41) and is driven by the rolling wheel (23) or (24) by engagement of a toothed wheel (46) with teeth (not shown) embedded in the rim of the rolling wheel (23) or (24).

The vertical shock absorbers (45) are always in compression, exerting a downward force. As the rolling BEMP moves along the curved rolling surface (25), the shock absorbers (45) accommodate the changes in height of the BEMP.

An advantage of the described frame (41) is that it restrains the rolling path of the rolling BEMP so that rails (which would inhibit flexing of the rolling surface (25)) are not required. The frame can be slidably connected to rails (not shown) on each side of the BEMP to further restrain sideways movement.

Other PTO Embodiments

The frame (41) described above can operate an overhead rack and pinion drive.

The frame (41) described above can be attached to hydraulic pistons that drive pressurized fluid through an accumulator to a rotary hydraulic engine that drives a rotary electrical generator.

By embedding permanent magnets in the rim of the wheels (23) and (24) of the rolling variant of the BEMP and passing the rim between conducting coils, electric current can be generated directly.

Spherical BEMP

An embodiment of the BEMP is based on a rolling sphere. This is shown in schematic plan view in FIG. 6a and in schematic side view in FIG. 6b. In FIG. 6a the top hemisphere is removed. In FIG. 6b the front side hemisphere is removed and the bowl-shaped rolling surface (48) is cut away.

A hollow sphere (47) rolls on a bowl-shaped rolling surface (48) fixed to the enclosing structure. Inside the hollow sphere (47) are five arms of equal length. Four arms (49) are fixed in a plane that passes through the centre of the sphere (47). The four arms (49) join in a cross with the outer ends fixed to the inner wall of the sphere (47). The fifth arm (50) is at right angles to the four arms (49) and fixed at one end to the cross junction of the four arms (49) and at the other end fixed to the inner wall of the sphere (47). Equal masses (51) are slidably attached to each of the four arms (49) and kept equidistant from the centre of the sphere (47). An eccentric mass (52) is slidably attached to the fifth arm (50). The equal masses (51) and the eccentric mass (52) move along their respective arms (49) and (50) by sliding along rails (53) driven by screw jacks (54) mounted on threaded rods (55).

By sliding the balanced masses along each pair of arms, the period of rolling oscillation of the sphere be varied independently in directions at right angles to each other.

The PTO system for the rolling sphere is a variant of the system shown in FIG. 4b.

Figure 7A:
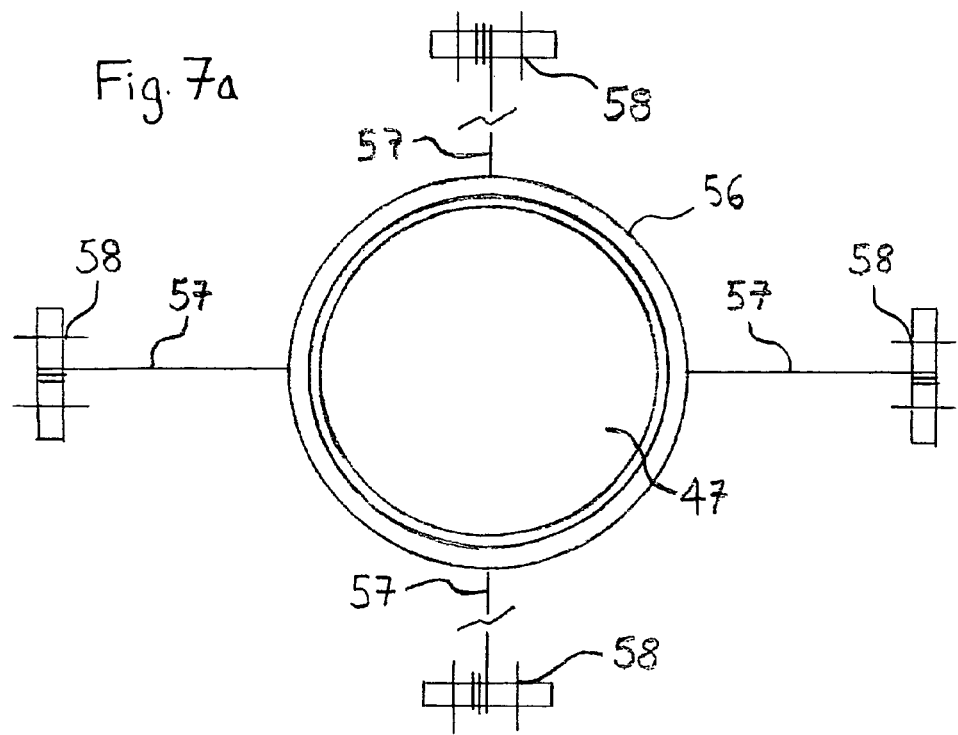
FIG. 7a: plan view of power take off system for a spherical BEMP
Figure 7B:
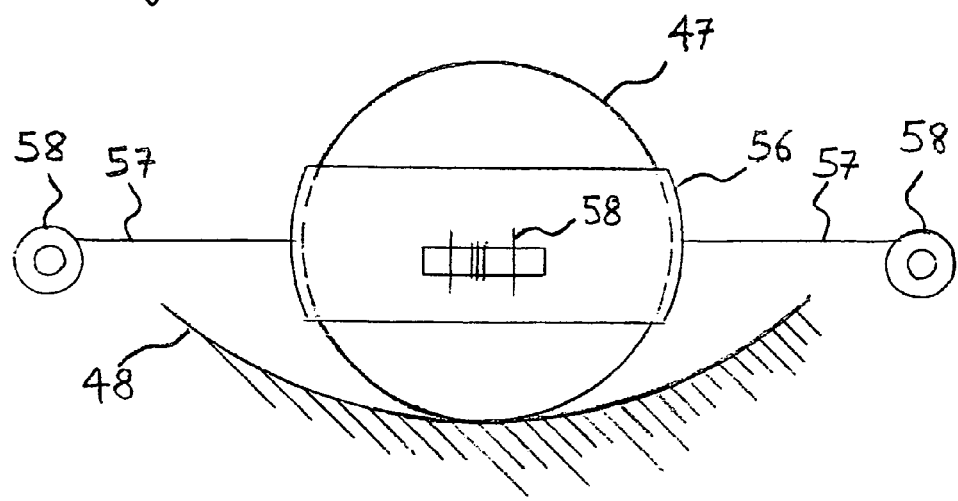
FIG. 7b: side view of power take off system for a spherical BEMP

As shown in a schematic plan view in FIG. 7a and in a schematic side view in FIG. 7b, the sphere (47) is gripped by an outer annular collar (56) that slides against the smooth outer surface of the sphere (47). The collar is attached to at least three radially symmetrical collar cables (57). In FIG. 7 four radially symmetrical collar cables (57) are shown. The cables (57) connect to spools (58). The spools are anchored to the enclosing structure (not shown) and capture power as described under the prior section 'cable-driven spool PTO'.

Tuning

In order to extract power from the BEMP in a wave power application, it is tuned to resonate with the dominant swell. As already described, the period of oscillation of the BEMP can be varied dynamically by varying the radii Rb and Re (see equation 5). Tuning can also be achieved by varying the rate of power take off so that the amplitude of oscillation is controlled.

For a conventional pendulum, the period is almost constant for small angles of deviation from the vertical of the moving mass. The percentage deviation of amplitude from the small angle period for a conventional pendulum can be derived from an infinite series:

$$\% \text{ deviation} = 100(A^2/16 + 11A^4/3072 + 173A^6/737280 + \ldots) \qquad 8.$$

where A is the angle of displacement from the vertical.
For A=45, 90, 135, 162 degrees (90% rotation)
the calculated % deviation=4, 18, 53, 100% respectively The % deviation for the rolling embodiment of the BEMP varies moderately with the position of the center of mass relative to the rolling axis. The average measured result for the same angles as above was 6.75, 15.8, 38.5, 92.2% respectively.

The period of oscillation can be increased by reducing the rate of power take off and so enabling larger amplitudes.

In a wave-power application, variation in swell amplitude makes precise control using power take off impractical, so that it is preferable for BEMP period to be made independent of amplitude.

This was achieved for the conventional pendulum by an invention attributed to Christian Huygens in 1658. His invention relies on suspending the pendulum mass from a cord that swings against shaped blocks, forcing the mass to follow a path that becomes steeper as amplitude increases.

An equivalent to the Huygens invention is a curved rolling surface for the rolling BEMP. The required surface is effectively flat for small amplitudes and becomes progressively steeper at higher amplitudes. Tests confirm that such a curved surface can provide a period that is independent of amplitude at amplitudes of the eccentric mass that deviate from the vertical by over 90 degrees. The curvature needed varies with the configuration of the BEMP, and so a dynamically variable curvature is required, as described in FIGS. 4a and 4b.

In another isochronous embodiment of the BEMP, progressive rate springs arranged for example as shock absorbers (37, 40) shown in FIG. 4b, enable the BEMP to be substantively isochronous at amplitudes of the eccentric mass that deviate from the vertical by over 90 degrees. When following a circular path, the period of oscillation of the BEMP increases with amplitude. The progressive rate springs in the shock absorbers (37,40) progressively increase the restoring force acting on the BEMP at higher amplitudes, so that the period of oscillation of the BEMP is kept constant.

Tests

Confirming tests of variation in oscillation period have been carried out with model BEMPs that include:
Axial shaft mounted on bearings (FIGS. 1a and 1b)
Axial shaft rolling on a flat and curved surface (FIG. 3a)
Axial shaft mounted on two rolling wheels (FIG. 3b) rolling on a flat and on a curved surface
A hollow sphere with balanced and eccentric masses (FIGS. 6a and 6b).

Energy Harvesting at the Micro Scale

The described embodiments of the BEMP in a WEC assume the use of pendulum masses in the range of tens to thousands of tonnes. It is also possible to use a BEMP on a millimeter scale, for example, using vibration to power remote sensors. If the vibration has the same characteristics as ocean swell ie oscillations of widely varying but also only slowly varying frequency, the dynamically tunable BEMP offers more efficient energy conversion than a non-tunable pendulum.

An embodiment of the BEMP employing a pendulum mass in the range 0.01 to 10 gm can be constructed as single vertical wheel with the axle turning on bearings mounted in blocks that slide in two parallel PTFE grooves. The centre of mass of the wheel can be varied by using a miniature stepper motor to move an eccentric mass to and from the axis of the wheel. Commercially available stepper motors are available in packages as small as 7×8×8 mm. New Scale Technologies Inc of NY provide an even smaller linear motor: the Squiggle motor, in a package as small as 2×2×6 mm. Power can be extracted using the well-known kinetic watch mechanism whereby an eccentric mass less than 3 mm in diameter rotates a pinion at over 10,000 rpm and this drives a rotary electrical generator. Alternatively power can be extracted from piezoelectric springs fixed at each end of the path of the wheel.

Advantages of Invention

Long period oscillations can be achieved without the large structures required for a conventional pendulum. A low-power embodiment of the BEMP used in a WEC can be less than one meter high. An equivalent one-megawatt BEMP can be under 12 m high: five times smaller than a conventional pendulum.

The period of oscillation can be adjusted continuously and rapidly. For example, to adjust the period from 5 seconds to 15 seconds in a conventional pendulum requires the pendulum mass to be shifted over 50 m along the pendulum arm. The same adjustment can be made in a one-megawatt BEMP by shifting the pendulum mass over a distance that is ten times smaller.

The BEMP can be substantially isochronous, enabling dynamic tuning when oscillations are of variable amplitude.

In a wave-power application, commercial levels of energy require large inertial masses. In an embodiment of the BEMP, these masses are suspended on conventional bearings. A rolling variant of the BEMP does not require conventional bearings and so avoids the associated costs of construction and maintenance.

In wave-power applications, potential sideways stresses on large inertial masses imply high structural and maintenance costs. In the rolling variant of the BEMP, wide axles and multiple wheels provide inherent lateral stability. In the spherical embodiment of the BEMP, the device is compliant with sideways forces and harvests energy from such forces so that costly anti-roll measures and massive sideways reinforcement can be avoided.

The invention claimed is:

1. A dynamically tunable compact pendulum with power take off comprising:
   a. a rigid rotatable structure arranged to rotate in at least one vertical plane and balanced about at least one horizontal axis of rotation;
   b. slidably attached to said rigid rotatable structure, at least two equal balanced masses, said balanced masses being always in pairs and movable in a straight line to and from a point on said horizontal axis of rotation at right angles to said horizontal axis of rotation and kept symmetrically equidistant from said horizontal axis of rotation and on opposite sides of said horizontal axis of rotation, whereby a moment of inertia of said rigid rotatable structure can be varied while maintaining a balance of said rigid rotatable structure;

c. said equal balanced masses and said horizontal axis of rotation being always aligned with each other, whereby an oscillation period of said rigid rotatable structure can be varied over a wide range by varying only said moment of inertia of said rigid rotatable structure;

d. slidably attached to said rigid rotatable structure, a single eccentric mass, movable to and from said point on said horizontal axis of rotation, whereby said moment of inertia of said rigid rotatable structure can be varied and whereby a restoring force applied to said rigid rotatable structure can be varied;

e. said eccentric mass being movable only at right angles to said straight line and being vertically below said horizontal axis of rotation when said dynamically tunable compact pendulum is in equilibrium, whereby said dynamically tunable compact pendulum is inherently stable;

f. attached to each of said equal balanced masses and attached to said eccentric mass a means for moving said masses to and from said horizontal axis of rotation;

g. a means for making oscillation period of said dynamically tunable compact pendulum substantially independent of oscillation amplitude;

h. a means for power take off from said rigid rotatable structure.

2. A dynamically tunable compact pendulum as claimed in claim 1 wherein said rigid rotatable structure comprises a frame attached to and rotating on an horizontal axial shaft held by and rotating inside a plurality of roller bearings.

3. A dynamically tunable compact pendulum as claimed in claim 1 wherein said rigid rotatable structure comprises a frame attached to and rotating on a horizontal axial shaft supported by and rolling on a curved surface, said horizontal axial shaft being contiguous with said curved surface.

4. A dynamically tunable compact pendulum as claimed in claim 1 wherein said rigid rotatable structure comprises a frame attached to and rotating on a horizontal axial shaft connecting at least two wheels supported by and rolling on a curved surface, said wheels being contiguous with said curved surface.

5. A dynamically tunable compact pendulum as claimed in claim 1 wherein said rigid rotatable structure comprises:
a hollow sphere supported by and rolling on a bowl-shaped surface.

6. A dynamically tunable compact pendulum as claimed in claim 1 wherein said means for moving said masses to and from said horizontal axis of rotation is a locking electrical screw jack moving on a threaded rod.

7. A dynamically tunable compact pendulum as claimed in claim 1 wherein said means for power take off from said rigid rotatable mass comprises:

a. a first wheel fixed to said rigid rotatable structure and with a same axis of rotation as said rigid rotatable structure;

b. a second wheel engaged with said first wheel whereby a drive shaft of said second wheel rotates and enables power take off.

8. A dynamically tunable compact pendulum as claimed in claim 1 wherein said means for power take off from said rigid rotatable mass comprises:

a. at least two cables arranged symmetrically about said horizontal axis of rotation;

b. one end of each of said cables being connected to said rigid rotatable structure, whereby rotating oscillation of said rigid rotatable structure creates alternating tension in said cables;

c. each of said cables being looped around a corresponding spool that is fixed to and rotates on a corresponding spool drive shaft;

d. each of said cables extending from each of said spools over a corresponding pulley each mounted on a corresponding progressive rate compression spring and terminating in a fixture whereby each of said cables is held under permanent tension and whereby rotation of each of said spool drive shafts enables power take off.

9. A dynamically tunable compact pendulum as claimed in claim 1 wherein said means for making said oscillation period of said dynamically tunable compact pendulum substantially independent of amplitude comprises:

a. said rigid rotatable structure rolling on a curved surface, whereby the restoring force increases with an amplitude of rotation;

b. said curved surface being a flexible sheet, fixed at a centre-line to an enclosing structure;

c. said flexible sheet being supported at each end by a sliding wedge;

d. each of said sliding wedges being attached to a linear motor, whereby said sliding wedges can be moved closer together or further apart so that a steepness of curvature of said curved surface can be increased and reduced respectively.

10. A dynamically tunable compact pendulum as claimed in claim 1 wherein said means for making said oscillation period of said dynamically tunable compact pendulum substantially independent of amplitude comprises:

a. said rigid rotatable structure being connected to at least two cables arranged symmetrically about said horizontal axis of rotation;

b. each of said cables running over a corresponding pulley mounted on a corresponding progressive rate compression spring, whereby a restoring force increases with an increasing amplitude of rotation.

11. A dynamically tunable compact pendulum as claimed in claim 4 wherein said means of power take off from said rigid rotatable structure comprises:

i. said rigid rotatable structure supported by and rolling on said curved surface;

j. said rigid rotatable structure enclosed in a rigid cuboid frame and rotating on a plurality of bearings fixed to said rigid cuboid frame;

k. said rigid cuboid frame being slidably attached to a plurality of parallel horizontal-overhead rails;

l. said rigid cuboid frame being attached to said parallel horizontal overhead rails by a plurality of vertical shock absorbers under a permanent compressive load, whereby said rigid cuboid frame is compliant with the motion of said rigid rotatable structure across said curved surface;

m. mounted on said rigid cuboid frame being a wheel that engages with said rigid rotatable structure.

* * * * *